United States Patent
Lim et al.

(10) Patent No.: US 11,364,712 B2
(45) Date of Patent: Jun. 21, 2022

(54) HARD COATING FILM AND IMAGE DISPLAY APPARATUS COMPRISING SAME

(71) Applicant: DONGWOO FINE-CHEM CO., LTD., Iksan-si (KR)

(72) Inventors: Geo San Lim, Seoul (KR); Min Kyung Kang, Gyeonggi-do (KR); Seung Hee Kim, Gyeonggi-do (KR)

(73) Assignee: DONGWOO FINE-CHEM CO., LTD, Jeollabuk-Do (KR)

( * ) Notice: Subject to any disclaimer, the term of this patent is extended or adjusted under 35 U.S.C. 154(b) by 124 days.

(21) Appl. No.: 16/614,018

(22) PCT Filed: May 15, 2018

(86) PCT No.: PCT/KR2018/005533
§ 371 (c)(1),
(2) Date: Nov. 15, 2019

(87) PCT Pub. No.: WO2018/212545
PCT Pub. Date: Nov. 22, 2018

(65) Prior Publication Data
US 2020/0061981 A1 Feb. 27, 2020

(30) Foreign Application Priority Data
May 19, 2017 (KR) .................. 10-2017-0062125

(51) Int. Cl.
| | | |
|---|---|---|
| *B32B 27/08* | (2006.01) | |
| *B32B 7/023* | (2019.01) | |
| *B29D 7/01* | (2006.01) | |
| *B32B 27/28* | (2006.01) | |

(52) U.S. Cl.
CPC .............. *B32B 27/08* (2013.01); *B29D 7/01* (2013.01); *B32B 7/023* (2019.01); *B32B 27/28* (2013.01); *B32B 2457/20* (2013.01)

(58) Field of Classification Search
CPC .............. B29D 7/01; B29K 2079/08; B29L 2031/3475; B32B 2457/20; B32B 27/08; B32B 27/28; B32B 7/023
See application file for complete search history.

(56) References Cited

U.S. PATENT DOCUMENTS

2015/0159044 A1* 6/2015 Bae .................... C08G 59/3281
523/435

FOREIGN PATENT DOCUMENTS

| | | |
|---|---|---|
| CN | 101016197 A | 8/2007 |
| JP | 2001-521201 A | 11/2001 |
| JP | 2006-051781 A | 2/2006 |
| JP | 2010-181613 A | 8/2010 |
| JP | 2014-000806 A | 1/2014 |
| JP | 2014-126570 A | 7/2014 |
| JP | 2017-021336 A | 1/2017 |
| KR | 2010-0007441 A | 1/2010 |
| KR | 10-1063902 B1 | 9/2011 |
| KR | 2013-0117694 A | 10/2013 |
| KR | 2015-0029886 A | 3/2015 |
| KR | 2016-0082639 A | 7/2016 |
| KR | 2016-0103682 A | 9/2016 |

OTHER PUBLICATIONS

Notification of Grounds for Rejection from counterpart Korean Patent Appln. No. 10-2017-0062125 dated Sep. 17, 2019, and its English translation.
Office action dated Jan. 18, 2022 from Japan Intellectual Property Office in a counterpart Japanese Patent Application No. 2019-561947 (all the cited references are listed in this IDS.) (English translation is also submitted herewith.).

\* cited by examiner

*Primary Examiner* — Lawrence D Ferguson
(74) *Attorney, Agent, or Firm* — The PL Law Group, PLLC

(57) ABSTRACT

The present invention relates to a hard coating film and an image display apparatus comprising same, the hard coating film having a hard coating layer formed on at least one surface of a polyimide-based substrate, the hard coating layer comprising the cured product of a hard coating composition, wherein the hard coating composition comprises a solvent for swelling a polyimide-based resin, and the hard coating film is configured such that when the reflectivity thereof is measured in the range of 400 nm to 800 nm, the maximum amplitude difference in the oscillations of the reflectivity is controlled at 0.5% or less, and thus can prevent an interference pattern.

4 Claims, No Drawings

HARD COATING FILM AND IMAGE DISPLAY APPARATUS COMPRISING SAME

TECHNICAL FIELD

This invention relates to a hard coating film and an image display apparatus including the hard coating film.

BACKGROUND ART

In an image display apparatus such as a cathode ray tube (CRT) display apparatus, a liquid-crystal display (LCD), a plasma display panel (PDP), an electroluminescent display (ELD), electronic paper, or the like, it is required for the image display surface thereof to reflect less of the light beams irradiated from an external light source and to have improved visibility. In this regard, a method of reducing the reflection at the image display surface of an image display apparatus and improving visibility using an optical laminate (e.g., an anti-reflective laminate) that includes a light-transmitting substrate and an anti-glare layer or anti-reflective layer formed thereon has been generally used.

However, there is a problem that interference fringes may be generated when the refractive indices of the light-transmitting substrate and the hard coating layer are different, and therefore, research to improve this problem has been conducted.

In this regard, Korean Patent Registration No. 10-1063902 discloses an optical film which includes a first transparent layer and a second transparent layer formed of materials having different refractive indices and in which the generation of interference fringes is suppressed due to the inclusion of a light-scattering interface having a ten-point average roughness (Rz) of 0.72 μm≤Rz≤3.5 m at the interface between the first transparent layer and the second transparent layer in contact with each other, but the process of applying a plurality of coating layers to prevent the generation of interference fringes is difficult to implement.

In addition, Korean Laid-Open Patent Publication No. 10-2013-0117694 discloses a hard coating film which includes a base film containing a (meth)acrylic resin as a main component and a hard coating layer and in which the generation of interference fringes is suppressed due to the inclusion of an intermixing layer, which is provided at a part of the base film that is in the vicinity of the interface with the hard coating layer and in which the material constituting the base film and the material constituting the hard coating layer are jointly used, but since an acrylic resin film which is vulnerable to the repeated application of stress typical in a flexible application is used in this case, there is a problem that it is difficult to apply such a hard coating film to a flexible image display apparatus.

PRIOR-ART DOCUMENTS

Patent Documents (Patent Document 1) Korean Patent Registration No. 10-1063902 (Sep. 2, 2011)
(Patent Document 2) Korean Laid-Open Patent Publication No. 10-2013-0117694 (Oct. 28, 2013)

SUMMARY OF INVENTION

Technical Problem

This invention has been designed to solve the above-described problems of the prior art, and is directed to providing a hard coating film, which can be applied to a flexible image display apparatus and in which the generation of interference fringes can be suppressed, and an image display apparatus including the hard coating film.

Solution to Problem

In order to achieve the above-described objectives, this invention provides a hard coating film, which includes: a polyimide-based substrate; and a hard coating layer formed on at least one surface of the polyimide-based substrate, wherein the hard coating layer includes a cured product of a hard coating composition, wherein the hard coating composition contains a solvent that allows the polyimide-based substrate to swell, and the hard coating film is characterized in that when the reflectance thereof is measured in the range of 400 nm to 800 nm, the maximum amplitude difference in the reflectance oscillations is 0.5% or less.

In addition, the image display apparatus of this invention is characterized in that it includes the above-described hard coating film.

Advantageous Effects of Invention

The hard coating film of this invention provides the following advantages: by including a polyimide-based substrate, the hard coating film can be even applied to a flexible image display apparatus; and since the maximum amplitude difference in the reflectance oscillations is adjusted to 0.5% or less, the generation of interference fringes can be suppressed.

DETAILED DESCRIPTION OF EMBODIMENT

In this invention, when a specific member is described as being provided "on" another member, this means not only that the specific member may be in contact with the other member but also that there may be a third member present between the two members.

In this invention, when a specific part is described as "comprising," "including," or "containing" a specific component, this does not preclude the presence of other component(s) unless otherwise stated, and means that the specific part may also include other component(s).

Hereinafter, this invention will be described in more detail.
<Hard Coating Film>

The hard coating film according to one aspect of this invention includes: a polyimide-based substrate; and a hard coating layer formed on at least one surface of the polyimide-based substrate, wherein the hard coating layer includes a cured product of a hard coating composition, wherein the hard coating composition contains a solvent that allows the polyimide-based substrate to swell, and the hard coating film has an advantage in that since the maximum amplitude difference in the reflectance oscillations is adjusted to 0.5% or less as measured in the range of 400 nm to 800 nm, it can be applied to a flexible image display apparatus, and the generation of interference fringes is suppressed.
Polyimide-Based Substrate The hard coating film according to one aspect of this invention includes a polyimide-based substrate.

By including a polyimide-based substrate having excellent durability against repeated bending as described above, the hard coating film according to one aspect of this invention has an advantage in that it can be applied to a flexible image display apparatus.

In this invention, a polyimide-based substrate refers to a substrate containing a polyimide-based compound as a main component thereof, and although examples thereof may include a polyimide, a polyamide imide, and the like, this invention is not limited thereto, and any substrate may be used without particular limitation as long as it contains a polyimide-based compound.

For example, the polyimide-based substrate may be obtained by polymerizing monomers containing a tetracarboxylic dianhydride and a diamine.

Although not particularly limited thereto, the tetracarboxylic dianhydride may be an aliphatic tetracarboxylic dianhydride or an aromatic tetracarboxylic dianhydride.

The aliphatic tetracarboxylic dianhydride may be bicyclo[2.2.2]oct-7-ene-2,3,5,6-tetracarboxylic dianhydride, bicyclo[2.2.2]octane-2,3,5,6-tetracarboxylic dianhydride, 5-(dioxotetrahydrofuryl-3-methyl)-3-cyclohexene-1,2-dicarboxylic anhydride, 4-(2,5-dioxotetrahydrofuran-3-yl)-tetraline-1,2-dicarboxylic anhydride, tetrahydrofuran-2,3,4,5-tetracarboxylic dianhydride, bicyclo-3,3',4,4'-tetracarboxylic dianhydride, 3c-carboxymethylcyclopentane-1r,2c,4c-tricarboxylic-1,4,2,3-dianhydride, 1,2,4,5-cyclohexanetetracarboxylic dianhydride, 1,2,3,4-cyclobutanetetracarboxylic dianhydride, 1,2,3,4-cyclopentanetetracarboxylic dianhydride, or the like.

In addition, the aromatic tetracarboxylic dianhydride may be 3,3',4,4'-biphenyltetracarboxylic dianhydride, 2,2',3,3'-biphenyltetracarboxylic dianhydride, 2,3',3,4'-biphenyltetracarboxylic dianhydride, pyromellitic dianhydride, oxydiphthalic dianhydride, 3,3',4,4'-benzophenonetetracarboxylic dianhydride, 3,3',4,4'-diphenylsulfonetetracarboxylic dianhydride, m-terphenyl-3,3',4,4'-tetracarboxylic dianhydride, 4,4'-(2,2-hexafluoroisopropylene)diphthalic dianhydride, 2,2'-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, 1,4,5,8-naphthalenetetracarboxylic dianhydride, 2,3,6,7-naphthalenetetracarboxylic dianhydride, 1,2,5,6-naphthalenetetracarboxylic dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, (1,1':3',1"-terphenyl)-3,3"',4,4"-tetracarboxylic dianhydride, 4,4'-(dimethylsiladiyl)diphthalic dianhydride, 4,4'-(1,4-phenylenebis(oxy))diphthalic dianhydride, or the like.

Among those mentioned above, from the viewpoint of obtaining a polyimide-based substrate with excellent chemical and physical properties, it is preferable that the tetracarboxylic dianhydride is an aromatic tetracarboxylic dianhydride, it is more preferable that the tetracarboxylic dianhydride is biphenyltetracarboxylic dianhydride, and it is even more preferable that the tetracarboxylic dianhydride is 3,3',4,4'-biphenyltetracarboxylic dianhydride, 2,2',3,3'-biphenyltetracarboxylic dianhydride, or 2,3',3,4'-biphenyltetracarboxylic dianhydride.

In addition, one type or a combination of two or more types of the tetracarboxylic dianhydride may be used.

Although not particularly limited thereto, the diamine may be an aliphatic diamine or an aromatic diamine.

The aliphatic diamine may be diaminobutane, diaminopentane, diaminohexane, diaminoheptane, diaminooctane, diaminononane, diaminodecane, diaminoundecane, diaminododecane, 1,4-diaminocyclohexane, 1,3-diaminocyclohexane, 1,2-diaminocyclohexane, 3-methyl-1,4-diaminocyclohexane, 5,5-dimethylcyclohexylamine, 1,3-bis(aminomethyl)cyclohexane, bis(4,4'-aminocyclohexyl)methane, bis(3,3'-methyl-4,4'-aminocyclohexyl)methane, bis(aminomethyl)norbornane, bis(aminomethyl)-tricyclo[5,2,1,0]decane, isophoronediamine, 1,3-diaminoadamantane, or the like.

In addition, the aromatic diamine may be p-phenylenediamine, m-phenylenediamine, 2,4-diaminotoluene, 2,6-diaminotoluene, 4,4'-diaminodiphenylmethane, 4,4'-diaminodiphenyl ether, 3,4'-diaminodiphenyl ether, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 4,4'-diaminobenzophenone, 3,3'-diaminobenzophenone, 4,4'-bis(4-aminophenyl)sulfide, 4,4'-diaminodiphenylsulfone, 4,4'-diaminobenzanilide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, 4,4'-bis(3-aminophenoxy)biphenyl, 2,2-bis(4-aminophenoxyphenyl)propane, bis[4-(4-aminophenoxy)phenyl]sulfone, bis[4-(3-aminophenoxy)phenyl]sulfone, or 2,2-bis[4-(4-aminophenoxy)phenyl]hexafluoropropane.

Among those listed above, from the viewpoint of obtaining a polyimide-based substrate with excellent chemical and physical properties, it is preferable that the diamine is an aromatic diamine, and it is more preferable that the diamine is p-phenylenediamine.

In addition, one type or a combination of two or more types of the diamine may be used.

As described above, the polyimide-based substrate may be obtained by polymerizing monomers containing a tetracarboxylic dianhydride and a diamine. More particularly, the polyimide-based substrate may be prepared by (1) synthesizing polyamic acid by reacting a tetracarboxylic dianhydride and a diamine in an organic solvent, and (2) imidizing the obtained polyamic acid.

(1) Synthesis of Polyamic Acid

The polyamic acid may be synthesized by reacting a tetracarboxylic dianhydride and a diamine in an organic solvent.

The above-described reaction is preferably carried out by dissolving the diamine in the organic solvent and then slowly adding the tetracarboxylic dianhydride to the obtained diamine solution while stirring the diamine solution.

Although not particularly limited thereto, the organic solvent may be: an amide-based solvent such as N-methyl-2-pyrrolidone, N,N-dimethylformamide, N,N-dimethylacetamide, N,N-diethylacetamide, or the like; a cyclic ester-based solvent such as γ-butyrolactone, γ-valerolactone, δ-valerolactone, γ-caprolactone, ε-caprolactone, α-methyl-γ-butyrolactone, or the like; a carbonate-based solvent such as ethylene carbonate, propylene carbonate, or the like; a glycol-based solvent such as triethylene glycol or the like; a phenol-based solvent such as m-cresol, p-cresol, 3-chlorophenol, 4-chlorophenol, or the like; acetophenone; 1,3-dimethyl-2-imidazolidinone; sulfolane; dimethyl sulfoxide, or the like. In addition, a general organic solvent such as phenol, O-cresol, butyl acetate, ethyl acetate, isobutyl acetate, propylene glycol methyl acetate, ethyl cellosolve, butyl cellosolve, 2-methyl cellosolve acetate, ethyl cellosolve acetate, butyl cellosolve acetate, tetrahydrofuran, dimethoxyethane, diethoxyethane, dibutyl ether, diethylene glycol dimethyl ether, methyl isobutyl ketone, diisobutyl ketone, cyclopentanone, cyclohexanone, methyl ethyl ketone, acetone, butanol, ethanol, xylene, toluene, chlorobenzene, terpene, a mineral spirit, a petroleum naphtha-based solvent, or the like may be used.

Among those listed above, it is preferable that an amide-based solvent is used, and one type or a combination of two or more types of the organic solvent may be used.

(2) Preparation of Polyimide-Based Substrate

The polyimide-based substrate may be prepared by imidizing the polyamic acid obtained in (1).

For example, the polyimide-based substrate may be prepared by casting a solution containing polyamic acid onto a support and applying heat thereto.

The solution containing polyamic acid may contain polyamic acid and an organic solvent, and may further contain an imidization catalyst, a phosphorus-containing organic compound, inorganic fine particles, or the like as necessary.

As the polyamic acid, the polyamic acid obtained in (1) may be used. In this case, one type or a combination of two or more types of the polyamic acid may be used. In addition, it is preferable that the content of the polyamic acid is 10% to 30% by mass based on the entire solution containing the polyamic acid.

The solvent may be selected from among the above-described organic solvents.

The imidization catalyst may serve to improve the physical properties (elongation, heat insulation resistance, and the like) of the polyimide-based film.

The imidization catalyst may be, specifically, a substituted or unsubstituted nitrogen-containing heterocyclic compound and an N-oxide compound thereof; a substituted or unsubstituted amino acid compound; an aromatic hydrocarbon compound having a hydroxyl group; or an aromatic heterocyclic compound, but this invention is not limited thereto.

The imidization catalyst may be, more specifically, 1,2-dimethylimidazole, N-methylimidazole, N-benzyl-2-methylimidazole, 2-methylimidazole, 2-ethyl-4-methylimidazole, 5-methylbenzimidazole, N-benzyl-2-methylimidazole, isoquinoline, 3,5-dimethylpyridine, 3,4-dimethylpyridine, 2,5-dimethylpyridine, 2,4-dimethylpyridine, 4-n-propylpyridine, or the like.

As the phosphorus-containing organic compound, a phosphate ester such as monocaproyl phosphate ester, monooctyl phosphate ester, monolauryl phosphate ester, monomyristyl phosphate ester, monocetyl phosphate ester, monostearyl phosphate ester, monophosphate ester of triethylene glycol monotridecyl ether, monophosphate ester of tetraethylene glycol monolauryl ether, monophosphate ester of diethylene glycol monostearyl ether, dicaproyl phosphate ester, dioctyl phosphate ester, dicapryl phosphate ester, dilauryl phosphate ester, dimyristyl phosphate ester, dicetyl phosphate ester, distearyl phosphate ester, diphosphate ester of tetraethylene glycol mononeopentyl ether, diphosphate ester of triethylene glycol monotridecyl ether, diphosphate ester of tetraethylene glycol monolauryl ether, diphosphate ester of diethylene glycol monostearyl ether, or the like, or an amine salt of the phosphate ester may be specifically used. The amine salt may be a salt of ammonia, monomethylamine, monoethylamine, monopropylamine, monobutylamine, dimethylamine, diethylamine, dipropylamine, dibutylamine, trimethylamine, triethylamine, tripropylamine, tributylamine, monoethanolamine, ethanolamine, triethanolamine, or the like, but this invention is not limited thereto. One type or a combination of two or more types of the phosphorus-containing organic compound may be used.

Specifically, the inorganic fine particles may be: an inorganic oxide powder such as titanium dioxide powder, silicon dioxide (silica) powder, magnesium oxide powder, aluminum oxide (alumina) powder, zinc oxide powder, or the like, which is in the form of fine particles; an inorganic nitride powder such as silicon nitride powder, titanium nitride powder, or the like, which is in the form of fine particles; an inorganic carbide powder such as silicon carbide powder or the like; an inorganic salt powder such as calcium carbonate powder, calcium sulfate powder, barium sulfate powder, or the like, which is in the form of fine particles, but this invention is not limited thereto. One type or a combination of two or more types of the inorganic fine particles may be used. In addition, in order to uniformly disperse the inorganic fine particles in the solution containing polyamic acid, a well-known means per se may be applied.

As the support onto which the solution containing polyamic acid is to be casted, a well-known support such as a stainless steel substrate, a stainless belt, or the like may be used, but this invention is not limited thereto. Here, it is preferable that the support is flat and wide, and from the viewpoint of enabling continuous production, it is preferable that the support is an endless support such as an endless belt.

There is no limitation on the method of casting the solution containing polyamic acid, but it is preferable that the solution is casted by extrusion coating or melt coating.

When the solution containing polyamic acid is casted onto the support, a coating film having self-supportability can be obtained.

In this case, onto one or both sides of the obtained coating film having self-supportability, a solution containing a surface treatment agent may be applied as necessary. In addition, in this specification, the treatment of the polyimide-based substrate with the surface treatment agent is not considered as a part of the "surface treatment of the polyimide-based substrate" to be described below.

The solution containing a surface treatment agent may contain the surface treatment agent and an organic solvent.

The surface treatment agent may be, specifically, a silane-based coupling agent, a borane-based coupling agent, an aluminum-based coupling agent, an aluminum-based chelating agent, a titanate-based coupling agent, an iron-based coupling agent, a copper-based coupling agent, or the like, but this invention is not limited thereto. Among those listed above, it is preferable that a silane-based coupling agent or a titanate-based coupling agent is used.

Specifically, the silane-based coupling agent may be: an epoxysilane-based coupling agent such as γ-glycidoxypropyltrimethoxysilane, γ-glycidoxypropyldiethoxysilane, β-(3,4-epoxycyclohexyl)ethyltrimethoxysilane, or the like; a vinylsilane-based coupling agent such as vinyltrichlorosilane, vinyltris(β-methoxyethoxy)silane, vinyltriethoxysilane, vinyltrimethoxysilane, or the like; an acrylsilane-based coupling agent such as γ-methacryloxypropyltrimethoxysilane or the like; an aminosilane-based coupling agent such as N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, or the like; γ-mercaptopropyltrimethoxysilane, γ-chloropropyltrimethoxysilane, or the like, but this invention is not limited thereto.

In addition, the titanate-based coupling agent may be isopropyl triisostearoyl titanate, isopropyl tridecyl benzene sulfonyl titanate, isopropyl tris(dioctylpyrophosphate)titanate, tetraisopropyl bis(dioctylphosphite)titanate, tetra(2,2-diallyloxymethyl-1-butyl)bis(ditridecylphosphite)titanate, bis(dioctylpyrophosphate)oxyacetate titanate, bis(dioctylpyrophosphate)ethylene titanate, isopropyltrioctanoyltitanate, isopropyltricumylphenyltitanate, or the like, but this invention is not limited thereto.

Among those listed above, it is preferable that an aminosilane-based coupling agent is used as the surface treatment agent, it is more preferable that γ-aminopropyltriethoxysilane, N-β-(aminoethyl)-γ-aminopropyltriethoxysilane, N-(aminocarbonyl)-γ-aminopropyltriethoxysilane, N-[β-(phenylamino)-ethyl]-γ-aminopropyltriethoxysilane, N-phenyl-γ-aminopropyltriethoxysilane, or N-phenyl-γ-aminopropyltrimethoxysilane is used as the surface treatment agent, and it is even more preferable that N-phenyl-γ-aminopropyltrimethoxysilane is used as the surface treatment agent.

One type or a combination of two or more types of the surface treatment agent may be used.

Specific examples of the organic solvent may include those listed above as the specific examples of the organic solvent used for the synthesis of polyamic acid.

Examples of a method of applying the solution containing a surface treatment agent onto a coating film having self-supportability may include well-known coating methods such as gravure coating, spin coating, silkscreen printing, dip coating, spray coating, bar coating, knife coating, roll coating, blade coating, die coating, and the like.

When heat is applied to the obtained coating film having self-supportability or to a coating film obtained by applying a solution containing a surface treatment agent as well as to the coating film having self-supportability, the imidization of the polyamic acid is induced, and thereby the polyimide-based substrate can be prepared.

Although there is no limitation on the heating temperature for inducing the imidization as long as it is a temperature at which imidization can take place, it is preferable that the heating is carried out at a temperature of 100° C. to 550° C., and it is more preferable that the heating is carried out at a temperature of 100° C. to 400° C. In this case, it is preferable to carry out the heating stepwise. For example, the heating may consist of first heating which is carried out at a temperature of 100° C. to 170° C., second heating which is carried out at a temperature of 170° C. to 220° C., third heating which is carried out at a temperature of 220° C. to 400° C., and fourth heating which is carried out at a temperature of 400° C. to 550° C.

During the heating, the film may be subjected to drawing as necessary. In this way, physical properties, such as thermal expansion coefficient and the like, of the polyimide-based substrate can be suitably adjusted. Here, the drawing may be carried out either as biaxial drawing, such as sequential biaxial drawing or simultaneous biaxial drawing, or as uniaxial drawing. It is preferable that the draw ratio is 2 to 10 in both vertical and horizontal axial directions. In addition, from the viewpoint of improving the dimensional stability of the polyimide-based substrate, the film may be further subjected to relaxation after the drawing.

The imidization of polyamic acid may also be performed by chemical imidization either in place of the heating or along with the heating.

Although there is no particular limitation on the specific method of performing the chemical imidization, the chemical imidization may be performed, for example, by casting a solution obtained by further adding a dehydrating agent and a catalyst to the above-described solution containing polyamic acid onto the support, and then applying heat thereto.

Although not particularly limited thereto, the dehydrating agent may be an aliphatic acid anhydride, an aromatic acid anhydride, an alicyclic acid anhydride, a heterocyclic acid anhydride, or the like. Specifically, the dehydrating agent may be acetic anhydride, propionic anhydride, butyric anhydride, formic anhydride, succinic anhydride, maleic anhydride, phthalic anhydride, benzoic anhydride, picolinic anhydride, or the like. Among those listed above, it is preferable that acetic anhydride is used. In addition, one type or a combination of two or more types of the dehydrating agent may be used.

The catalyst may be an aliphatic tertiary amine, an aromatic tertiary amine, a heterocyclic tertiary amine, or the like, and may be, specifically, trimethylamine, triethylamine, dimethylaniline, pyridine, 1-picoline, isoquinoline, quinoline, or the like. Among those listed above, it is preferable that isoquinoline is used, but this invention is not limited thereto.

When the casting of the solution onto the support and the heating are carried out by the above-described methods, the polyimide-based substrate can be prepared.

In addition, besides those listed above, well-known polyimide-based substrates such as a polyimide-based substrate prepared by reacting a tetracarboxylic dianhydride and diisocyanate may be used as the polyimide-based substrate.

Hard Coating Composition

The hard coating film according to one aspect of this invention includes a hard coating layer formed on at least one surface of the above-described polyimide-based substrate, wherein the hard coating layer includes a cured product of a hard coating composition, wherein the hard coating composition contains a solvent that allows the polyimide-based substrate to swell.

Here, to allow the polyimide-based substrate to swell may mean to allow the polyimide compound, which is a main component of the polyimide-based substrate, to swell.

As such, when a hard coating layer is formed on at least one surface of the polyimide-based substrate by applying a hard coating composition containing a solvent that allows the polyimide-based substrate to swell, the swelling of the polyimide-based substrate is induced at the interface between the polyimide-based substrate and the hard coating layer, and thereby a phenomenon that the components of the polyimide-based substrate are intermixed with the components of the hard coating layer occurs. Such intermixing of the components of the polyimide-based substrate with the components of the hard coating layer is advantageous in that since the difference in refractive index between the hard coating layer and the polyimide-based substrate is reduced, it is possible to suppress the occurrence of interfacial reflection which is proportional to the difference in refractive index and, accordingly, suppress the generation of interference fringes caused by the interfacial reflection.

In addition, since the swelling of the polyimide-based substrate is induced as described above, the interface between the polyimide-based substrate and the hard coating layer is not even but has irregularities, which causes a light beam reflected from the surface of the hard coating layer and a light beam reflected at the interface to be directed in different directions, in which case the coherence of the light beams enabling the light beams to interfere with each other may be significantly reduced. Therefore, it becomes possible to adjust the maximum amplitude difference in the reflectance oscillations, which is caused by thin-film interference, of the hard coating film to 0.5% or less as measured in the range of 400 nm to 800 nm and, accordingly, suppress the generation of interference fringes. According to one embodiment of this invention, it is preferable to adjust the maximum amplitude difference in the reflectance oscillations to 0.2% or less because, in this case, there is an advantage in that the generation of interference fringes can be more effectively suppressed.

The solvent that allows the polyimide-based substrate to swell may be, specifically, one or more selected from the group consisting of ketones such as methyl ethyl ketone, methyl isobutyl ketone, cyclohexanone, and the like, acetates such as ethyl acetate, butyl acetate, and the like, and amides such as dimethylformamide, dimethylacetamide, and the like, wherein one type or a combination of two or more types of thereof may be used.

In addition to the solvents listed above, it is also possible to additionally use a solvent used in the art.

The solvent may be included in an amount of 10 wt % to 95 wt % and specifically 20 wt % to 80 wt % based on 100 wt % of the entire hard coating composition containing the solvent. When the content of the solvent is within the above-described range, there is an advantage that the viscosity can be adjusted so as to promote workability, the swelling of the polyimide-based substrate can be sufficiently induced, and the drying time can be shortened.

According to one embodiment of this invention, the hard coating composition may contain one or more selected from the group consisting of a light-transmitting resin, a photoinitiator, a solvent, and an additive in addition to the above-described solvent.

The light-transmitting resin may be a photocurable resin, wherein the photocurable resin may include a photocurable (meth)acrylate oligomer or monomer, but there is no particular limitation on the light-transmitting resin in this invention, and any type of light-transmitting resin used in the art may be used without limitation.

For example, as the photocurable (meth)acrylate oligomer, epoxy (meth)acrylate, urethane (meth)acrylate, or the like may be typically used, and urethane (meth)acrylate is preferably used. The urethane (meth)acrylate may be prepared, in the presence of a catalyst, using a polyfunctional (meth)acrylate having a hydroxy group in its molecule and a compound having an isocyanate group. Specific examples of the (meth)acrylate having a hydroxy group in its molecule include 2-hydroxyethyl (meth)acrylate, 2-hydroxyisopropyl (meth)acrylate, 4-hydroxybutyl (meth)acrylate, caprolactone ring-opened hydroxyacrylate, a mixture of pentaerythritol tri/tetra(meth)acrylate, and a mixture of dipentaerythritol penta/hexa(meth)acrylate, wherein one or more selected from the group consisting thereof may be used. In addition, specific examples of the compound having an isocyanate group include 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl) cyclohexane, trans-1,4-cyclohexene diisocyanate, 4,4'-methylene bis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylene bis(2,6-dimethylphenyl isocyanate), 4,4'-oxybis(phenyl isocyanate), trifunctional isocyanate derived from hexamethylene diisocyanate, and trimethane propanol adduct toluene diisocyanate, wherein one or more selected from the group consisting thereof may be used, but this invention is not limited thereto.

The above-described monomer is a monomer that is typically used in the art and has an unsaturated group such as a (meth)acryloyl group, a vinyl group, a styryl group, an allyl group, or the like as a photocurable functional group in its molecule, with a (meth)acryloyl group being preferred thereamong.

Specific examples of the monomer having a (meth)acryloyl group include neopentyl glycol acrylate, 1,6-hexanediol (meth)acrylate, propylene glycol di(meth)acrylate, triethylene glycol di(meth)acrylate, dipropylene glycol di(meth) acrylate, polyethylene glycol di(meth)acrylate, polypropylene glycol di(meth)acrylate, trimethylolpropane tri(meth) acrylate, trimethylolethane tri(meth)acrylate, 1,2,4-cyclohexane tetra(meth)acrylate, pentaglycerol tri(meth) acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexatri (meth)acrylate, bis(2-hydroxyethyl)isocyanurate di(meth) acrylate, hydroxyethyl (meth)acrylate, hydroxypropyl (meth)acrylate, hydroxybutyl (meth)acrylate, isooctyl (meth)acrylate, isodecyl (meth)acrylate, stearyl (meth)acrylate, tetrahydrofurfuryl (meth)acrylate, phenoxyethyl (meth) acrylate, and isoborneol (meth)acrylate, wherein one or more selected from the group consisting thereof may be used, but this invention is not limited thereto.

Among the photocurable (meth)acrylate oligomers or monomers listed above as examples of the light-transmitting resin, one type or a combination of two or more types thereof may be used.

Although there is no particular limitation on the amount of the light-transmitting resin in this invention, the light-transmitting resin may be included in an amount of 1 wt % to 80 wt % based on 100 wt % of the entire hard coating composition containing the light-transmitting resin. When the content of the light-transmitting resin is within the above-described range, there is an advantage that excellent hardness is obtained, and the occurrence of curling can be suppressed.

There is no particular limitation on the photoinitiator in this invention, and any type of photoinitiator used in the art may be used without limitation.

For example, the photoinitiator may be a hydroxy ketone, an aminoketone, a hydrogen-abstraction type photoinitiators, or the like, and may be, more specifically, 2-methyl-1-[4-(methylthio)phenyl]-2-morpholine propanone-1, diphenyl ketone, benzyldimethyl ketal, 2-hydroxy-2-methyl-1-phenyl-1-one, 4-hydroxycyclophenyl ketone, 2,2-dimethoxy-2-phenyl-acetophenone, anthraquinone, fluorene, triphenylamine, carbazole, 3-methylacetophenone, 4-chloroacetophenone, 4,4-dimethoxyacetophenone, 4,4-diaminobenzophenone, 1-hydroxycyclohexylphenyl ketone, benzophenone, diphenyl(2,4,6-trimethylbenzoyl)phosphine oxide, or the like, but this invention is not limited thereto.

Although there is no particular limitation on the amount of the photoinitiator in this invention, the photoinitiator may be included in an amount of 0.1 wt % to 10 wt % and specifically 1 wt % to 5 wt % based on 100 wt % of the entire hard coating composition containing the photoinitiator. When the content of the photoinitiator is within the above-described range, there is an advantage that since insufficient curing of the hard coating composition is less likely to occur even in the case of shorten curing time, the degradation of mechanical properties can be prevented, and the occurrence of cracks can be suppressed.

Although there is no particular limitation on the additive in this invention, examples of the additive may include inorganic oxide fine particles, a leveling agent, and the like.

The inorganic oxide fine particles have an advantage in that they can improve mechanical properties such as wear resistance, scratch resistance, pencil hardness, and the like by being uniformly dispersed in the coating film.

As the inorganic oxide fine particles, particles having a particle diameter of 100 nm or less may be used. In this case, since the occurrence of aggregation in the composition is prevented, a uniform coating film can be formed, and thus the degradation of mechanical properties can be prevented.

Examples of the inorganic oxide fine particles may include silicon oxide (silica), titanium oxide, aluminum oxide, zinc oxide, tin oxide, zirconium oxide, and the like, but this invention is not limited thereto.

The leveling agent may be a silicone-based leveling agent, a fluorine-based leveling agent, an acrylic leveling agent, or the like, but this invention is not limited thereto. When a leveling agent is added as such, there is an advantage that smoothness and coating ability can be imparted at the time of forming the coating film.

The hard coating film according to one aspect of this invention includes a hard coating layer formed on at least one surface of a polyimide-based substrate, wherein the hard coating layer includes a cured product of a hard coating composition, wherein the hard coating composition contains a solvent that allows the polyimide-based substrate to swell, and the hard coating film has an advantage in that since the maximum amplitude difference in the reflectance oscillations is adjusted to 0.5% or less as measured in the range of 400 nm to 800 nm, it can be applied to a flexible image display apparatus, and the generation of interference fringes is suppressed while hardness, adhesion, and the like are not sacrificed.

<Image Display Apparatus>

Another aspect of this invention provides an image display apparatus, which includes the above-described hard coating film.

Although not particularly limited thereto, the image display apparatus may be a liquid-crystal display (LCD), a field-emission display (FED) device, a plasma display panel (PDP), an organic light-emitting diode (OLED), a flexible display device, or the like.

In particular, due to the inclusion of a hard coating film including a polyimide-based substrate, the image display apparatus according to one embodiment of this invention can be more advantageously applied to a flexible image display apparatus.

Hereinafter, preferred examples will be provided to promote understanding of this invention, but it should be apparent to those skilled in the art that the following examples are merely illustrative of this invention and that various changes and modifications can be made within the scope and technical spirit of this invention and are encompassed within the scope of the appended claims. In the following examples and comparative examples, "%" and "part(s)" for indicating contents are by weight unless otherwise specified.

PREPARATION EXAMPLES: PREPARATION OF HARD COATING COMPOSITION

Preparation Example 1

A hard coating composition was prepared by blending 25 parts by weight of pentaerythritol triacrylate, 25 parts by weight of polyfunctional acrylate (Miwon Specialty Chemical Co., Ltd., MIRAMER SP1106), 47 parts by weight of methyl ethyl ketone, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a polypropylene (PP) filter.

Preparation Example 2

A hard coating composition was prepared by blending 25 parts by weight of pentaerythritol triacrylate, 25 parts by weight of polyfunctional acrylate (Miwon Specialty Chemical Co., Ltd., MIRAMER SP1106), 47 parts by weight of ethyl acetate, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a PP filter.

Preparation Example 3

A hard coating composition was prepared by blending 25 parts by weight of pentaerythritol triacrylate, 25 parts by weight of polyfunctional acrylate (Miwon Specialty Chemical Co., Ltd., MIRAMER SP1106), 25 parts by weight of propylene glycol monomethyl ether, 22 parts by weight of methyl ethyl ketone, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a PP filter.

Preparation Example 4

A hard coating composition was prepared by blending 30 parts by weight of polyfunctional acrylate (Miwon Specialty Chemical Co., Ltd., MIRAMER SP1106), 50 parts by weight of nanosilica sol dispersed in methyl ethyl ketone (12 nm, 40% solids), 17 parts by weight of ethyl acetate, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a PP filter.

Preparation Example 5

A hard coating composition was prepared by blending 25 parts by weight of pentaerythritol triacrylate, 25 parts by weight of polyfunctional acrylate (Miwon Specialty Chemical Co., Ltd., MIRAMER SP1106), 47 parts by weight of propylene glycol monomethyl ether, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a PP filter.

Preparation Example 6

A hard coating composition was prepared by blending 25 parts by weight of pentaerythritol triacrylate, 25 parts by weight of polyfunctional acrylate (Miwon Specialty Chemical Co., Ltd., MIRAMER SP1106), 47 parts by weight of toluene, 2.7 parts by weight of 1-hydroxycyclohexylphenyl ketone, and 0.3 part by weight of a silicone-based additive (BYK Additives & Instruments, BYK-UV3570) using a stirrer and filtering the mixture using a PP filter.

Examples and Comparative Examples: Hard Coating Film

Example 1

A hard coating film was prepared by applying the hard coating composition of Preparation Example 1 onto a polyimide (PI)-based film (80 m) such that the applied composition had a thickness of 10 m after curing, drying the solvent, and then performing UV irradiation at a cumulative amount of 500 J/cm2.

Example 2

A hard coating film was prepared in the same configuration and manner as in Example 1, except that the hard coating composition of Preparation Example 2 was used instead of the hard coating composition of Preparation Example 1.

Example 3

A hard coating film was prepared in the same configuration and manner as in Example 1, except that the hard coating composition of Preparation Example 3 was used instead of the hard coating composition of Preparation Example 1.

Example 4

A hard coating film was prepared in the same configuration and manner as in Example 1, except that the hard coating composition of Preparation Example 4 was used instead of the hard coating composition of Preparation Example 1.

Comparative Example 1

A hard coating film was prepared in the same configuration and manner as in Example 1, except that the hard coating composition of Preparation Example 5 was used instead of the hard coating composition of Preparation Example 1.

Comparative Example 2

A hard coating film was prepared in the same configuration and manner as in Example 1, except that the hard coating composition of Preparation Example 6 was used instead of the hard coating composition of Preparation Example 1.

EXPERIMENTAL EXAMPLES

Experimental Example 1: Evaluation of Ability of Solvent to Induce Swelling of Polyimide-Based Substrate The solvent(s) used in Preparation Examples 1 to 6 was/were applied onto the same PI-based film (80 μm) as used in Examples and Comparative Examples such that a wet film with a thickness of 10 μm was formed. When two or more types of the solvents were used, the same mixing ratios as used in Preparation Examples were applied. After drying the solvent(s) in an 80° C. forced convection oven, the ability of the solvent(s) to induce the swelling of the polyimide-based substrate was evaluated by evaluating the haze of the dried film according to the evaluation criteria described below. Here, the haze was evaluated using a haze meter (MH-150, Murakami Color Research Laboratory), and since the haze value increases as the substrate develops irregularities on its surface while it is swelled and then dried, a higher haze value indicates a greater ability of the solvent(s) to induce swelling. The results of this experiment are shown in Table 1.
 <Evaluation Criteria>
 ⊚: Haze is 5% or more
 ○: Haze is 3% or more and less than 5%
 Δ: Haze is 1% or more and less than 3%
 x: Haze is less than 1%

Experimental Example 2: Determination of Maximum Amplitude Difference in Reflectance Oscillations The substrate of the film was bonded to a black acrylic plate using a transparent pressure-sensitive adhesive such that the hard coating layer part of the film faced upward, and then 12° specular reflectance of the film was measured in the range of 400 nm to 800 nm. Subsequently, the maximum value of the difference between neighboring crests and troughs on the reflectance graph was determined, and the results thereof are shown in Table 1.

Experimental Example 3: Evaluation of Ability to Prevent Interference Fringes

The substrate of the film was bonded to a black acrylic plate using a transparent pressure-sensitive adhesive such that the hard coating layer part of the film faced upward, and then the degree of interference fringe generation at the coated surface under a three-wavelength lamp was evaluated according to the evaluation criteria described below. The results of this experiment are shown in Table 1.
 <Evaluation Criteria>
 ○: Interference fringes are not visible
 Δ: Interference fringes are weakly visible
 x: Interference fringes are clearly visible Experimental Example 4: Testing of Pencil Hardness The substrate part of each of the hard coating films according to Examples and Comparative Examples was fixed to a glass material such that the hard coating layer part of the film faced upward, and then pencil hardness was determined using a pencil hardness tester (PHT, SB Science, Korea) under a 1 kg load. The test involved producing five strokes of 1 cm in length using a pencil of the same hardness, wherein the hardness of the pencil that did not make a scratch even with four or more strokes was determined as the pencil hardness, the results of which are shown in Table 1.

Experimental Example 5: Testing of Adhesion

After the substrate part of each of the hard coating films according to Examples and Comparative Examples was bonded to a glass using a transparent pressure-sensitive adhesive such that the hard coating layer part of the film faced upward, horizontal and longitudinal scratches at 1 mm intervals were made on the hard coating layer part of the film using a utility knife, whereby 100 square-shaped scratches were formed, and then adhesion was tested three times using a Nichiban tape. The results are shown in Table 1, where the adhesion is expressed in terms of "the number of squares left unremoved after the adhesion test."

TABLE 1

| | Haze (%) | Ability to induce swelling | Maximum amplitude difference (%) | Ability to prevent interference fringes | Pencil hardness | Adhesion |
|---|---|---|---|---|---|---|
| Example 1 | 0.8 | ◉ | 0.2 | ◉ | 3H | 100/100 |
| Example 2 | 0.3 | ○ | 0.3 | ○ | 3H | [0110] 00/100 |
| Example 3 | 0.2 | Δ | 0.3 | ○ | 3H | 100/100 |
| Example 4 | 0.4 | ◉ | 0.1 | ◉ | 3H | 100/100 |
| Comparative Example 1 | 0.2 | X | 0.6 | X | 3H | 100/100 |
| Comparative Example 2 | 0.2 | X | 0.8 | X | 3H | 100/100 |

Referring to Table 1, it can be seen that when the conditions required by this invention were satisfied, that is, when the maximum amplitude difference in the reflectance oscillations was 0.5% or less and the hard coating layer included a cured product of a hard coating composition containing a solvent that allows the polyimide-based substrate to swell (Examples 1 to 4), interference fringes were more effectively prevented and hardness and adhesion were not degraded compared to when the conditions of this invention were not satisfied (Comparative Examples 1 to 2).

In addition, it can be seen that when the maximum amplitude difference in the reflectance oscillations satisfied 0.2% or less (Examples 1 and 4) as is preferred in this invention, interference fringes were more effectively prevented.

What is claimed is:

1. A hard coating film comprising:
   a polyimide-based substrate; and
   a hard coating layer provided on at least one surface of the polyimide-based substrate,
   wherein the hard coating layer includes a cured product of a hard coating composition, wherein the hard coating composition contains a light-transmitting resin and a solvent that allows the polyimide-based substrate to swell,
   wherein the light-transmitting resin comprises a (meth) acrylate oligomer or monomer,
   wherein the solvent is selected from the group consisting of methyl ethyl ketone, methyl isobutyl ketone, cyclohexanone, ethyl acetate, butyl acetate, dimethylformamide, dimethylacetamide, and a combination thereof,
   wherein the maximum amplitude difference in the reflectance oscillations is 0.2% or less when the reflectance of the hard coating film is measured in the range of 400 nm to 800 nm.

2. The hard coating film of claim 1, wherein the hard coating composition further contains one or more selected from the group consisting of a photoinitiator and an additive.

3. An image display apparatus comprising the hard coating film of claim 1.

4. The image display apparatus of claim 3, which is a flexible image display apparatus.

* * * * *